United States Patent
Ma et al.

(10) Patent No.: US 6,587,696 B1
(45) Date of Patent: Jul. 1, 2003

(54) POWER CONTROL TECHNIQUE UTILIZING FORWARD PILOT CHANNEL

(75) Inventors: Lin Ma, Fort Worth, TX (US); Zhigang Rong, Fort Worth, TX (US)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/363,583

(22) Filed: Jul. 29, 1999

Related U.S. Application Data

(60) Provisional application No. 60/094,888, filed on Jul. 31, 1998.

(51) Int. Cl.$^7$ ................................................ H04Q 7/00
(52) U.S. Cl. ........................ 455/522; 455/69; 370/335; 370/342
(58) Field of Search ................................ 370/335, 342; 455/69, 522

(56) References Cited

U.S. PATENT DOCUMENTS 6,233,439 B1 * 5/2001 Jalali .......................... 455/127

FOREIGN PATENT DOCUMENTS

WO     WO 96/37083    * 11/1996

* cited by examiner

*Primary Examiner*—Lee Nguyen
(74) *Attorney, Agent, or Firm*—Allen Scott Lineberry; Steven A. Shaw; Federico Fraccaroli

(57) ABSTRACT

A method and system for providing efficient transmission power control commands to a base station. In a third generation IS-95 CDMA network, for example, cdma2000, the forward pilot channel is used to estimate the received signal power level. In the presently preferred embodiment, a mobile station measures the received pilot channel power, on a forward link pilot channel. The loss experienced on the pilot channel is estimated as the difference between the pilot channel power transmitted at the base station and the pilot channel power received at the mobile station. The pilot power transmission power is typically fixed based upon the operating environment of the base station. The fixed pilot channel transmission power can be transmitted via a message from the base station. Based on the estimated channel loss, the received traffic power is calculated as the difference between the initial traffic channel transmission power, that is, the power when the mobile station is assigned a traffic channel, and the estimated loss added to any power control gain corrections that have occurred. The initial traffic channel transmission power can be a default value or can be assigned by the base station using signaling messages, e.g., a forward common control channel (or F-CCCH) message. Power control decisions are made based on the ratio of received traffic channel energy with an estimate of interference and noise on the channel. A "power control decision" is made by comparing the ratio with a predetermined threshold to determine if the power level should be raised or lowered.

11 Claims, 2 Drawing Sheets

POWER CONTROL TECHNIQUE UTILIZING FORWARD PILOT CHANNEL

CROSS-REFERENCE TO RELATED APPLICATION

This application claims priority from Provisional Application Serial No.: 60/094,888 filed Jul. 31, 1998, which is hereby incorporated by reference.

FIELD OF THE INVENTION

This invention relates to wireless telecommunications and, more particularly, to controlling the received traffic channel power of a mobile station in a wireless telecommunications system.

BACKGROUND OF THE INVENTION

CDMA

The use of code division multiple access (CDMA) modulation techniques is one of several techniques for facilitating communications in which a large number of system users are present. CDMA techniques utilize uniquely assigned orthogonal codes to spread digitized data over a particular frequency spectrum. The orthogonality of the codes enables multiple mobile station users to overlay their data on the same frequency spectrum. Each overlaid transmission adds to the noise within the frequency spectrum. Without a priori knowledge of the spreading codes used, the collective transmissions appear as noise to a receiver.

Typically, CDMA systems are organized in a cellular structure. That is, a base station which handles mobile station communications for a particular area is centrally located in the area. All of the mobile stations in the area served by the base station transmit and receive data in a manner controlled by the base station. This cellular architecture creates a detrimental effect known as the "near-far" effect that is not found in other forms of wireless communication. The near-far effect is a result of the overlaying of transmissions in the same frequency spectrum. It occurs when a mobile station's transmissions, as received by a base station, are more powerful than the other mobile stations being serviced by the base station. The more powerful mobile station may tend to drown out the signals of mobile stations which are less powerful or farther away from the base station.

Power Control

To alleviate the near-far effect problem in CDMA communications, many systems use a power control system to control the transmissions of the mobile stations. Such systems are typically divided into three mechanisms, or "loops": open-loop, closed-loop, and outer-loop power control. Open-loop power control in CDMA systems consists of an adjustment of mobile station transmission power based on transmission power received at the base station. Open-loop control in CDMA systems provides for a coarse estimate of shadowing. Closed-loop power control for mobile stations in CDMA systems operates by comparing the signal quality from a mobile station, as received at the base station, to a predetermined threshold. Based on the comparison, the mobile station is commanded through a feedback mechanism to increase or decrease its transmission power at predetermined increments.

Outer loop control mechanisms are responsible for maintaining the robustness of the control mechanism. The outer loop control adjusts the system parameters by which the closed-loop controller operates. Thus, in a CDMA system, the outer loop power control mechanism is responsible for maintaining the proper base station threshold signal quality level by which the closed-loop mechanism operates.

In IS-95 CDMA systems, a fast power control procedure is implemented on the reverse link. Third generation digital personal communication systems are being proposed that will achieve higher data rates than the current IS-95 systems. These systems use a bandwidth equal to or wider than 1.25 MHz. All of the currently proposed third generation systems include some form of fast forward link power control command to control base station transmission power. For example, the proposed cdma2000 system uses fast closed loop power control on the forward link dedicated channels. The closed loop system updates at a rate of 800 Hz. A power control update rate of 800 Hz is capable of mitigating fading in mobile stations moving at slow (approximately 3 km/h) to medium (approximately 80 km/h) speeds thereby reducing the required base station transmit power and increasing overall system capacity. The closed loop power control compensates for medium to fast fading and for inaccuracies in open loop power control. Furthermore, fast forward link power control is effective for adaptation of dynamically changing interference conditions due to the activation and deactivation of high power, high data rate users.

Power Control Under Proposed CDMA2000 System

To implement power control under the current cdma2000 proposal, a forward fundamental channel (F-FCH) is transmitted at a variable rate, as in TIA/EIA-95-B. When a F-FCH is assigned, power control bits for reverse link power control are punctured onto the F-FCH prior to Walsh spreading. Forward link power control is accomplished using the punctured power control bits to estimate the received forward traffic channel power level. In a cdma2000 system with chip rate three times that in IS-95, for a power control update rate of 800 Hz, 1 symbol out of 12 on each carrier should be punctured for a multicarrier option, 3 consecutive symbols out of 36 for the direct spread 1 antenna case, and 1 symbol out of 18 on each antenna for the direct spread 2 antennas case. Only a very small portion of the forward link total transmitted power is used as the punctured power control bits are transmitted at the same power level as that of the traffic data bits. It remains questionable as to whether the punctured power control bits of this currently proposed method can provide sufficient energy for accurate estimation of channel condition for forward link power control.

SUMMARY OF THE INVENTION

The disclosed embodiments provide a method and system for providing efficient transmission power control in a base station. In a third generation IS-95 CDMA network, for example, cdma2000, the forward pilot channel, which is much stronger than that of a traffic channel in an IS-95 system, is used to estimate the received signal power level.

In the presently preferred embodiment, a mobile station measures the received pilot channel power, on a common forward link pilot channel. The received pilot power is usually measured in the dB scale. The loss experienced on the pilot channel is estimated as the difference between the pilot channel power transmitted at the base station and the pilot channel power received at the mobile station. The pilot power transmission power is typically fixed based upon the operating environment of the base station. The base station operating environment can vary depending on cell architecture, e.g., macro and micro cells, topography, and other factors. The fixed pilot channel transmission power can be transmitted via a message from the base station.

Based on the estimated channel loss, the received traffic channel power is calculated as the difference between the initial traffic channel transmission power, that is, the power when the mobile station is assigned a traffic channel, and the estimated loss added to any power control gain corrections that have occurred. The initial traffic channel transmission power can be a default value or can be assigned by the base station using signaling messages, e.g., a forward common control channel (or F-CCCH) message.

Power control decisions are made based on the ratio of received traffic channel energy with an estimate of interference and noise on the channel. One method of calculating the received traffic channel is to multiply the received traffic channel power by the duration per chip (or data unit). A "power control decision" is made by comparing the ratio with a predetermined threshold to determine if the power level should be raised or lowered.

The disclosed embodiments can provide several advantages. For example, the pilot channel is transmitted continuously at a much stronger power level than that of the punctured PC bits. Therefore, more energy can be collected from the pilot channel when estimating the channel condition, particularly pilot channel loss. The traffic channel energy estimate is also improved under the same interference conditions because of the greater amount of collected signal energy. An improved traffic channel energy estimate results in a power control command which can compensate for changes in the channel condition more effectively. The result is that less transmission power is required to achieve the same performance with less interference being experienced by other user. Thus, system capacity can be increased. For another example, use of the pilot channel for forward link power control does not require the extraction of punctured power control bits. Instead, it requires knowledge by the mobile station of only one parameter when compared to the punctured bit approach described above. That is, the disclosed embodiments require knowledge of the transmission power level of the traffic channel when it is assigned to the mobile station.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Various embodiments of the disclosed method and system will be described with reference to the current cdma2000 proposal. However, the disclosed embodiments are not limited to use only in cdma2000 or CDMA systems in general.

Figure 1:
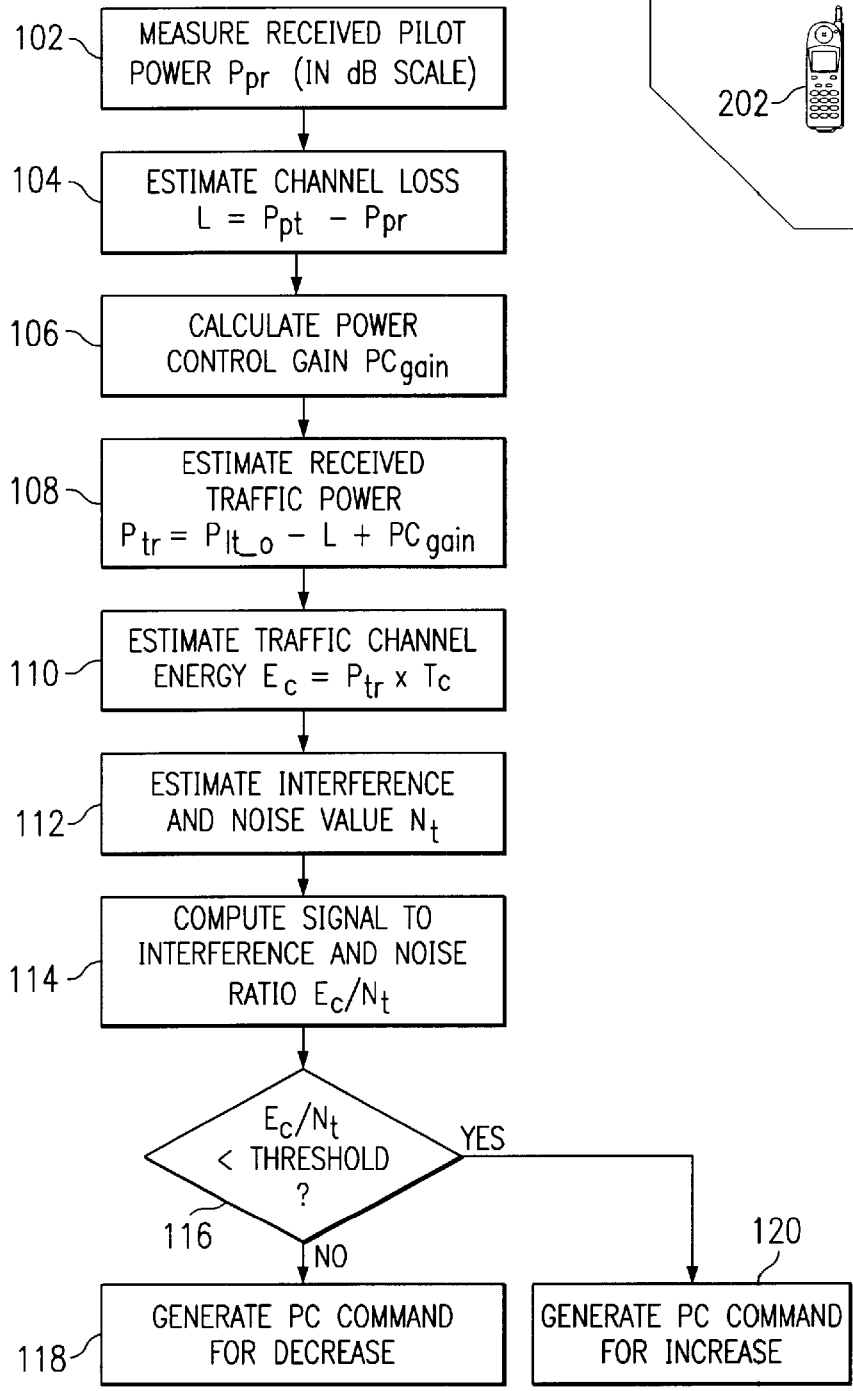
FIG. 1 depicts a flow chart of the presently preferred embodiment.

FIG. 1 depicts a flow chart of the presently preferred embodiment. First, the mobile station must gain knowledge of the forward link pilot channel power. In the presently preferred embodiment, the mobile station derives a measurement of the received common forward link pilot channel power, $P_{pr}$ (Step 102). Such a measurement is usually represented in the decibels (dB) scale. Next, the loss of power, L, experienced on the pilot channel is estimated (Step 104). The estimate of loss, L, is usually represented as the difference of the pilot channel power transmitted at the base station, $P_{pt}$, and the received pilot channel power, $P_{pr}$ (that is, $L=P_{pt}-P_{pr}$). The pilot channel transmission power is usually a fixed level that is dependent, at least partially, on the operating environment of the base station. Pilot channel transmission power can be a known default value or can be acquired by a message transmitted from the base station to all mobile stations within the cell.

An estimate of the traffic channel power, $P_{tr}$, that will be received at the mobile station can now be made. The estimate uses information about the received power on the pilot channel and knowledge of any forward link power control gain adjustments. In the presently preferred embodiment, the power control gain that has been applied to the forward link, $PC_{gain}$, is calculated (Step 106). One method of calculating the power control gain, $PC_{gain}$, is to sum up all of the previous gain corrections that have been made to the forward link. However, it is possible to estimate or track the power control gain in other ways. Next, the received traffic channel power, $P_{tr}$, is estimated as the difference of original traffic channel transmission power, $P_{tr\_o}$, and the estimated loss, L, added to the power control gain, $PC_{gain}$, (that is, $P_{tr}=P_{tr\_o}-L+PC_{gain}$) (Step 108).

Next a signal to interference and noise ratio (or SINR) is calculated. First, the signal component of the ratio, represented as the received traffic channel energy, $E_c$, is estimated (Step 110). The received traffic channel energy, $E_c$, is calculated as the received traffic channel transmission power, $P_{tr}$, multiplied by the chip duration, $T_c$ (that is, $E_c = P_{tr} * T_c$). Next, an interference and noise value, $N_t$, is calculated (Step 112). An interference and noise value, $N_t$, can be calculated in several ways. A common method for calculation is despreading the pilot channel and calculating the variance of the despreading output. In the presently preferred embodiment, the SINR is calculated as the received traffic channel energy, $E_c$, divided by the interference and noise value, $N_t$ (that is, $E_c/N_t$) (Step 114). To generate a power control decision in the presently preferred embodiment, the SINR is then compared to a predetermined threshold (Step 116). If the SINR is greater than the threshold value a power control decision to decrease the forward link gain is made (Step 118). If the SINR is less than the threshold value a power control decision to increase the forward link gain is made (Step 120). In the presently preferred embodiment, an outer-loop control mechanism common to most wireless communications power control systems can also make power control corrections based on signal threshold quality.

Figure 2:
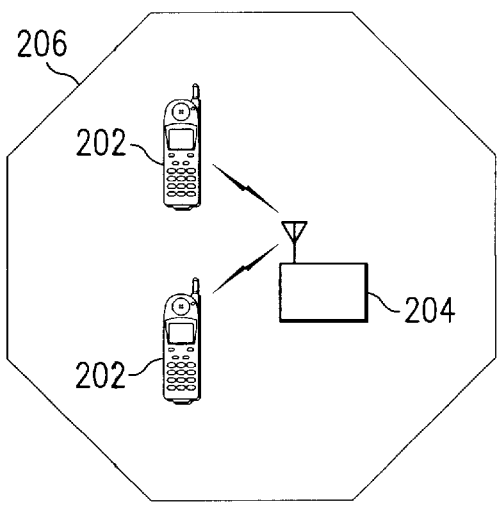
FIG. 2 depicts a block diagram of a wireless communications system suitable for implementing the disclosed embodiments.

FIG. 2 depicts a block diagram of a wireless communications system suitable for implementing the disclosed embodiments. A base station 204 defines an individual cell 206 of a wireless communications system. The base station 204 includes hardware and software functions required to communicate over communications channels of the wireless system and includes transmitters and receivers for communication with mobile stations 202. The mobile stations 202 include the necessary hardware and software functions to communicate with the base station 204 over communications channels of the wireless system, including, for example, a controller, at least one transmitter and at least one receiver for base station communication. The mobile stations 202 are configured to generate forward link power control commands using the pilot channel according to the disclosed embodiments. The base station 204 is configured to transmit information for generating forward link power control commands and receive the commands from the mobile stations 202 using the pilot channel according to the disclosed embodiments.

Figure 3:
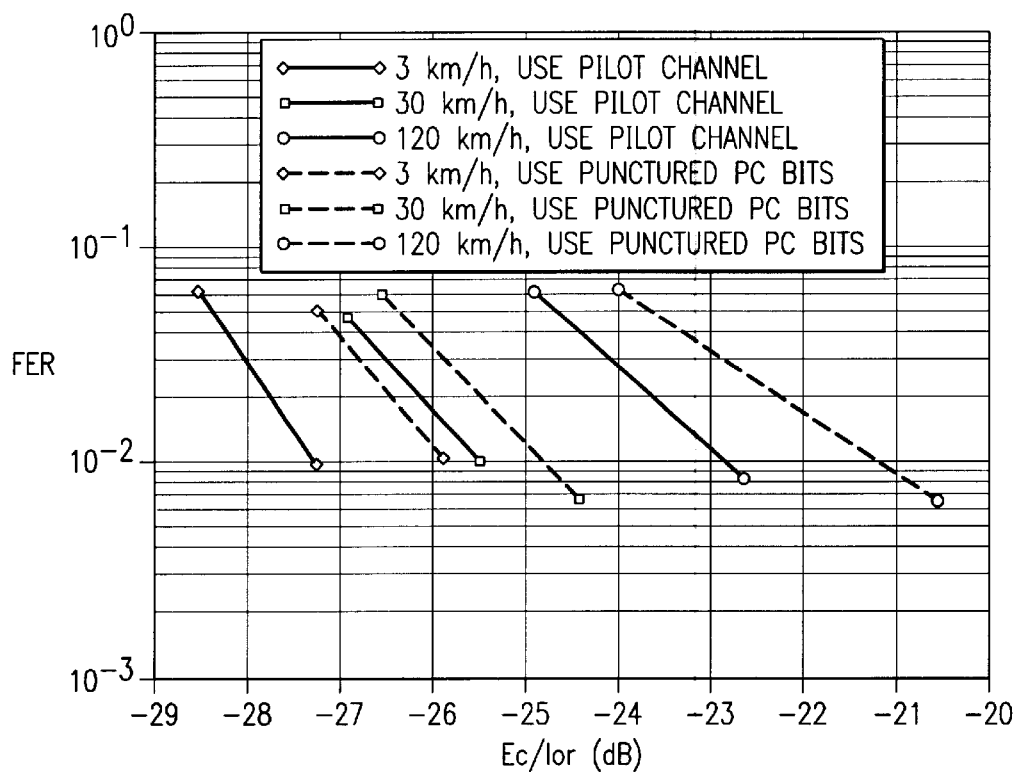
FIG. 3 depicts simulation results of the FER (frame erasure rate) performance of a cdma2000 system using the presently preferred embodiment of forward link power control using the pilot channel.

FIG. 3 depicts simulation results of the FER (frame erasure rate) performance of a cdma2000 system using the presently preferred embodiment of forward link power control using the pilot channel. The simulation conditions depict differing mobile station velocities in 1-path fading channel. Simulation results using punctured power control bits for forward link power control are also depicted. The results show the $E_c/I_{or}$ values. This ratio is equivalent to the ratio of the required traffic channel transmission power to the total base station transmission power, i.e., $E_c/I_{or}=-20$ dB means that 1% of the total base station transmission power is required for the traffic channel. To achieve a 1% FER with forward link power control using the pilot channel, with mobile station velocities of 3 km/h, 30 km/h, and 120 km/h, the $E_c/I_{or}$ values are about 1.8 dB, 0.7 dB, and 1.5 dB less than those required using the punctured power control bit scheme over the same mobile station velocities, respectively.

Figure 4:
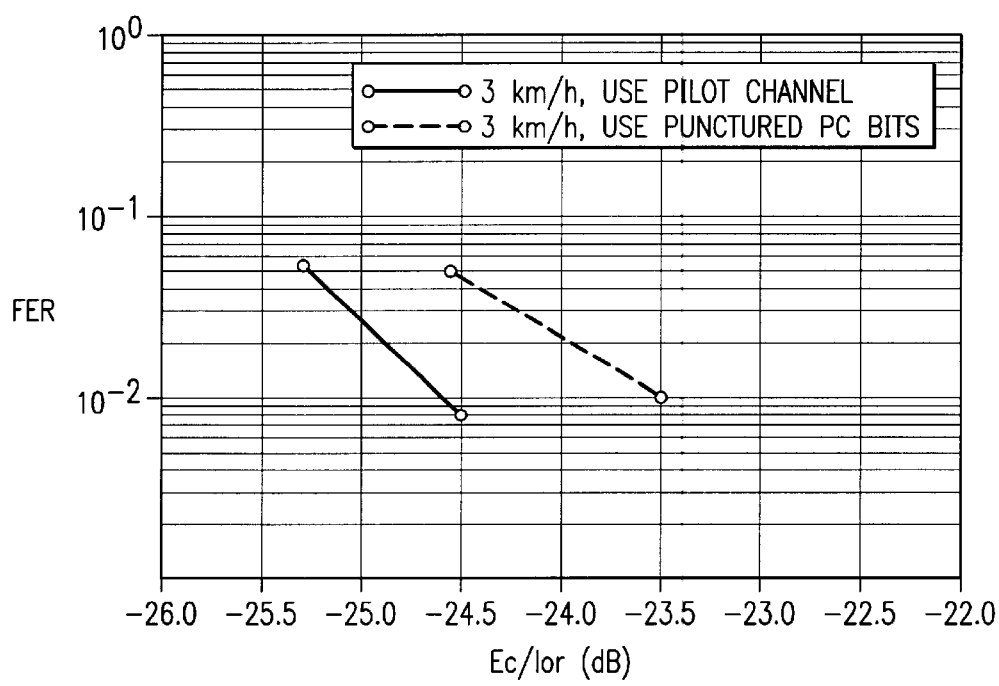
FIG. 4 also depicts a simulation result of the FER (frame erasure rate) performance of a cdma2000 system using the presently preferred embodiment of forward link power control using the pilot channel.

FIG. 4 also depicts a simulation result of the FER performance of a cdma2000 system using the presently preferred embodiment of forward link power control using the pilot channel. The simulation conditions depict a mobile station velocity of 3 km/h in 2-path fading channel. The simulation result using punctured power control bits for forward link power control is also depicted. The result shows that the $E_c/I_{or}$ value required to achieve a 1% FER with forward link power control using the pilot channel is about 1.1 dB less than the value required using the punctured power control bit scheme.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, the pilot channel transmission power, $P_{pt}$, is described as being acquired by the mobile station via a message from the base station. However, it is possible for the pilot channel transmission power, $P_{pt}$, to be acquired in other ways, for example, an estimate based on a default value for a particular type of base station.

For another example, a method of estimating loss, L, on the pilot channel has been described. However, the pilot channel loss, L, may be estimated or calculated based on different calculated values or values supplied by the base station.

For another example, the original traffic channel transmission power, $P_{tt\_o}$, is used to calculate an estimate of the received traffic channel power, $P_{tr}$. The original traffic channel transmission power, $P_{tt\_o}$, can be acquired through a signaling message, for example, transmitted by the base station on a forward common control channel (F-CCCH). The original traffic channel transmission power, $P_{tt\_o}$, can also be based on a default value. Additionally the original traffic channel transmission power, $P_{tt\_o}$, could be calculated, for example, as an estimate based on other values.

For another example, a method of estimating the interference and noise value, $N_t$, has been described. However, estimating the interference and noise value, $N_t$, can be accomplished by compiling information based on the energy of the despreading output of one unused Walsh code channel. Other ways of achieving this estimate or calculating an interference and noise value can also be used.

For another example, the disclosed embodiments have been described in the context of a cdma2000 system. However, the disclosed embodiments can be used in other wireless systems which require power control.

What is claimed is:

1. A method of forward link power control utilizing a pilot channel, comprising the steps of:

measuring the received power of a pilot channel;

estimating the power loss on said pilot channel;

accumulating forward link power control gain adjustments;

estimating the received power of a traffic channel;

calculating a traffic channel energy value;

calculating an interference and noise value; and generating a power control decision using said traffic channel energy value and said interference and noise value.

2. The method of claim 1, wherein said power control decision is for a cdma2000 system.

3. The method of claim 1, wherein said pilot channel is received at a mobile station.

4. The method of claim 1, wherein said pilot channel is transmitted by a base station.

5. The method of claim 1, further comprising the step of estimating the transmission power of said pilot channel.

6. The method of claim 1, wherein said estimating the received power of a traffic channel step further comprises the step of summing any forward link power control gain corrections.

7. The method of claim 1, wherein said generating step further comprises the step of calculating the ratio of the energy of said traffic channel to an interference and noise value.

8. The method of claim 1, wherein said generating step further comprises the step of comparing a predetermined threshold to the ratio of the energy of said traffic channel to an interference and noise value.

9. The method of claim 1, wherein said power control decision is a forward link power control decision.

10. The method of claim 1, wherein said power control decision is to decrease the forward link gain if the ratio of the energy of said traffic channel to an interference and noise value is greater than a predetermined threshold.

11. The method of claim 1, wherein said power control decision is to increase the forward link gain if the ratio of the energy of said traffic channel to an interference and noise value is less than a predetermined threshold.

* * * * *